United States Patent (10) Patent No.: US 7,634,668 B2
White et al. (45) Date of Patent: Dec. 15, 2009

(54) METHOD AND APPARATUS FOR ADAPTIVE POWER CONSUMPTION

(75) Inventors: Jonathan B. White, Fort Collins, CO (US); James L. van Welzen, Raleigh, NC (US)

(73) Assignee: Nvidia Corporation, Santa Clara, CA (US)

( * ) Notice: Subject to any disclaimer, the term of this patent is extended or adjusted under 35 U.S.C. 154(b) by 452 days.

(21) Appl. No.: 10/226,708

(22) Filed: Aug. 22, 2002

(65) Prior Publication Data

US 2004/0039954 A1 Feb. 26, 2004

(51) Int. Cl.
G06F 1/00 (2006.01)
G06F 1/26 (2006.01)
G06F 9/45 (2006.01)
H01R 21/00 (2006.01)

(52) U.S. Cl. .................... 713/300; 713/320; 702/60; 703/22

(58) Field of Classification Search ................ 713/300, 713/320; 702/60; 703/22
See application file for complete search history.

(56) References Cited

U.S. PATENT DOCUMENTS

| 5,339,445 | A | * | 8/1994 | Gasztonyi | ............... | 713/324 |
| 5,991,883 | A | * | 11/1999 | Atkinson | ................ | 713/300 |
| 6,002,409 | A | | 12/1999 | Harkin | .................... | 345/506 |
| 6,076,171 | A | | 6/2000 | Kawata | | |
| 6,208,350 | B1 | | 3/2001 | Herrera | .................. | 345/430 |
| 6,212,645 | B1 | | 4/2001 | Tjandrasuwita | | |
| 6,425,086 | B1 | | 7/2002 | Clark et al. | | |
| 6,510,525 | B1 | | 1/2003 | Nookala et al. | | |
| 6,549,243 | B1 | * | 4/2003 | Takashimizu et al. | ....... | 348/558 |
| 6,549,802 | B2 | | 4/2003 | Thornton | | |
| 6,574,739 | B1 | | 6/2003 | Kung et al. | | |
| 6,636,976 | B1 | | 10/2003 | Grochowski et al. | | |
| 6,665,802 | B1 | * | 12/2003 | Ober | ......................... | 713/320 |

(Continued)

FOREIGN PATENT DOCUMENTS

EP 0784481 A2 9/1997

(Continued)

OTHER PUBLICATIONS

Lorch J.R. et al.: Software Strategies for Portable Computer Energy Management: IEEE Personal Communications, IEEE, Communications Society, US vol. 5, No. 3 Jun. 1, 1997, pp. 60-73, XP000765376 ISSN: 1070-9916 the whole document.

(Continued)

*Primary Examiner*—Thomas Lee
*Assistant Examiner*—Stefan Stoynov (57) ABSTRACT

A method for adapting power consumption of a processor based upon an application demand is provided. The method initiates with determining an application demand based upon a current processing operation. Then, a time interval associated with the application demand is determined. Next, unnecessary power consuming functions for the application demand are determined. Then, a clock frequency for the unnecessary power consuming functions is reduced for the time interval. In one embodiment, the power is terminated to the unnecessary power consuming functions. In another embodiment, the clock frequency of the processor is adjusted for at least a portion of the time interval. A program interface for adapting power consumption of a computer system, processor instructions for adapting power consumption of a computer system and a processor are included.

8 Claims, 6 Drawing Sheets

U.S. PATENT DOCUMENTS

| | | | |
|---|---|---|---|
| 6,691,236 B1 * | 2/2004 | Atkinson | 713/320 |
| 6,721,892 B1 | 4/2004 | Osborn et al. | |
| 6,768,659 B2 | 7/2004 | Gillingham et al. | |
| 6,907,535 B2 | 6/2005 | Fang | |
| 6,910,139 B2 | 6/2005 | Ishidera | |
| 6,947,865 B1 | 9/2005 | Mimberg et al. | |
| 6,990,594 B2 | 1/2006 | Kim | |
| 7,043,649 B2 | 5/2006 | Terrell, II | |
| 7,100,013 B1 | 8/2006 | de Waal | |
| 7,100,061 B2 | 8/2006 | Halepete et al. | |
| 7,256,788 B1 | 8/2007 | Luu et al. | |
| 2001/0044909 A1 | 11/2001 | Oh et al. | 713/600 |
| 2002/0029374 A1 | 3/2002 | Moore | |
| 2002/0101257 A1 * | 8/2002 | Kawahara et al. | 326/38 |
| 2003/0210271 A1 * | 11/2003 | King | 345/771 |

FOREIGN PATENT DOCUMENTS

EP          0991191 A2     4/2000

OTHER PUBLICATIONS

Melear C.: Hardware and Software Techniques for Power Conservation in Portable Devices: Wescon Conference IEEE Center, Hoes Lane, US Sep. 27, 1994, pp. 453-461, XP0000532610 ISSN: 1044-6036, the whole document.

Dubois, Y.A. et al.: ASIC Design Considerations for Power Management in Laptop Computers: Euro ASIC 91 Paris, France May 27-31, 1991, Los Alamitos, CA USA, IEEE Comput. Soc. US, pp. 348-351, XP010024394 ISBN: 0-8186-2185-0, the whole document.

Young R. et al: "Adaptive Clock Speed Control for Variable Processor Loading" Motorola Technical Developments, Motorola Inc. Schaumburg, IL, US, vol. 15, May 1, 1992, pp. 43-44, XP000306138, ISSN: 0887-5286, the whole document.

* cited by examiner

| I ($f_I$) | P ($f_P$) | B ($f_B$) | |
|---|---|---|---|
| $x_0$ | $y_0$ | $z_0$ | $t_0$ |
| $x_1$ | $y_1$ | $z_1$ | $t_1$ |
| $x_2$ | $y_2$ | $z_2$ | $t_2$ |
| ... | ... | ... | |
| $x_n$ | $y_n$ | $z_n$ | $t_n$ |

METHOD AND APPARATUS FOR ADAPTIVE POWER CONSUMPTION

BACKGROUND OF THE INVENTION

1. Field of the Invention

This invention relates generally to power management and more particularly to a method and apparatus to reduce the power consumption of portable devices to increase battery life by dynamically modifying a clock speed of a processor.

2. Description of the Related Art

Portable electronic devices rely on batteries to provide the necessary power for the operation of the device. Consumers using the portable devices want to be able to use the devices for longer time periods in between having to recharge the batteries. As such, there is a continual effort to increase battery performance and to perform the operations in more energy efficient ways, even as the applications performed by the devices become more sophisticated, and in some cases, require more power.

The central processing unit (CPU) is generally the largest consumer of power for the portable computing devices. However, the power consumption of the CPU is generally not capable of being modified for the various applications being executed. That is, there is a one size fits all approach for the power consumption of the microprocessors for the devices even though some applications require only a fraction of the CPU power. For example, when watching a movie on a laptop computer having a digital video disc (DVD) player, a clock speed of only up to about 20% of the operating clock speed of the CPU may be necessary. While there has been some attempts to reduce the power consumption of microprocessors, none allow for the power consumption to be modified based upon a predicted application demand. Furthermore, when the operating system is placed into an idle mode, the CPU clock frequency does not change. Therefore, the power consumption of the CPU remains unnecessarily high.

As a result, there is a need to solve the problems of the prior art to provide a method and apparatus for reducing the power consumption of microprocessors, such as CPUs, where the power consumed by the CPU is based upon the application being executed.

SUMMARY OF THE INVENTION

Broadly speaking, the present invention fills these needs by providing a method and apparatus for reducing power consumption of microprocessors. It should be appreciated that the present invention can be implemented in numerous ways, including as a process, a system, or a device. Several inventive embodiments of the present invention are described below.

In one aspect of the invention a method for adapting power consumption of a microprocessor based upon an application demand is provided. The method initiates with determining an application demand based upon a current processing operation. Then, a time interval associated with the application demand is determined. Next, unnecessary power consuming functions for the application demand are determined. Then, a clock frequency for the unnecessary power consuming functions is reduced for the time interval. In one embodiment, the power is terminated to the unnecessary power consuming functions. In another embodiment, the clock frequency of the microprocessor is adjusted for at least a portion of the time interval.

In another aspect of the invention, a method of adapting processing power of a microprocessor is provided. The method initiates with tracking a load level for a time interval. Then, idle time during the time interval is monitored. Next, a percentage of maximum processing power of the microprocessor sufficient to power the load level is determined. Then, the processing power of the microprocessor is adjusted to the determined percentage. In one embodiment, a plurality of load levels are tracked. In another embodiment, the plurality of load levels are associated with the frames of a motion picture expert group (MPEG) standard.

In yet another aspect of the invention, a program interface for adapting power consumption of a computer system is provided. The program interface includes an interface for adjusting a clock frequency of a microprocessor. The interface enables the adjustment of the clock frequency in response to a determined processing load level, wherein the adjustment of the clock frequency is defined to vary as a function of time. In one embodiment, the program interface includes an interface for adjusting a voltage of a microprocessor. In this embodiment, the interface enables the adjustment of the voltage in response to a determined processing load level, wherein the adjustment of the voltage is defined to vary as a function of time.

In still yet another aspect of the invention, processor instructions for adapting power consumption of a computer system are provided. The processor instructions include computer code configured to trigger an adjustment of a clock frequency of a microprocessor. The computer code enables the adjustment of the clock frequency in response to a determined processing load level, wherein the adjustment of the clock frequency is defined to vary as a function of time. In one embodiment, the processor instructions include computer code configured to trigger an adjustment of a voltage of a microprocessor. In this embodiment, the computer code enables the adjustment of the voltage in response to a determined processing load level, wherein the adjustment of the voltage is defined to vary as a function of time.

In another aspect of the invention, a processor apparatus is provided. The processor apparatus includes an instruction decoder configured to identify an instruction that writes a value to a control register. The control register affects a clock frequency used to clock the processor apparatus. In one embodiment, the processor apparatus includes an instruction decoder configured to identify an instruction that writes a value to a control register. In this embodiment, the control register affects a voltage source used to supply power to the processor apparatus.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for an apparatus and method for adapting power consumption of a microprocessor based on an application demand. It will be obvious, however, to one skilled in the art, that the present invention may be practiced without some or all of these specific details. In other instances, well known process operations have not been described in detail in order not to unnecessarily obscure the present invention.

The embodiments of the present invention provide a method and apparatus that minimizes the power consumption of a microprocessor by predicting a load level based upon application demand. In one embodiment, predictive knowledge accessed through the application level, which is based upon the process operation being currently executed, determines the load level necessary for an upcoming time period. It should be appreciated that the application uses predictive knowledge of what is happening to modify a clock speed or voltage supplied to a microprocessor, rather scaling based upon past performance. The forward looking approach described herein is enabled through a feedback loop between the microprocessor and the application level in one embodiment. The predictive knowledge can be used to enable selected functions, or domains within a processor, to have their clock frequency set to zero. Alternatively, the microprocessor speed can be throttled up or down by setting a clock frequency and/or voltage based upon a load required over an interval of time.

Figure 1:
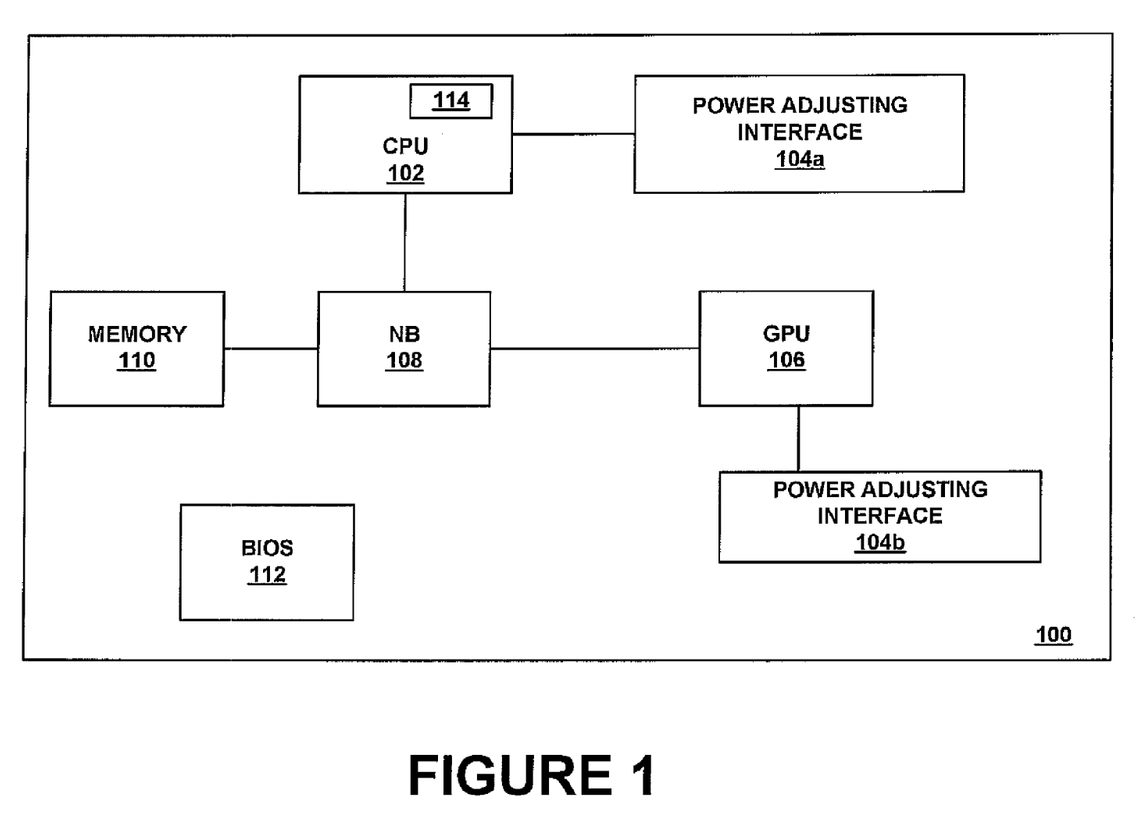
FIG. 1 is a high level schematic diagram of a system having microprocessors enabled to modulate power consumption based upon application demand in accordance with one embodiment of the invention.

FIG. 1 is a high level schematic diagram of a system having microprocessors enabled to modulate power consumption based upon application demand in accordance with one embodiment of the invention. Device 100 includes central processing unit (CPU) 102, memory 110, and graphics processing unit (GPU) 106, each in communication with a support chipset 108 (e.g., Northbridge and Southbridge chips). As is well known, the chipset 108 controls interaction with memory 110, the peripheral component interconnect (PCI) bus, level 2 cache, and all accelerated graphics port (AGP) activities. Therefore, the chipset 108 couples to graphics card 118 by way of an AGP bus. In one embodiment, Northbridge chip set 108 can also include function as an integrated graphics processor (IGP). In other embodiments, the chipset 108 can be incorporated in the CPU 102 and/or the GPU 106. CPU 102 includes control register 114 which responds to instructions for controlling the clock speed of the CPU. Basic input/output system (BIOS) 112 is also included.

Still referring to FIG. 1, power adjusting interfaces 104a and 104b are in communication with CPU 102 and GPU 106, respectively. It should be appreciated that GPU 106 also includes a control register responding to instructions for controlling the clock speed of the GPU. In one embodiment, power adjusting interfaces 104a and 104b are application program interfaces (API). In another embodiment, power adjusting interfaces 104a and 104b are operating system (OS) interfaces. In yet another embodiment, power adjusting interfaces 104a and 104b are new processor instructions configured to set the clock frequency of the processor. Thus, the interfaces described herein include a hook to the application being executed as the application provides the means to determine future demands for the CPUs performance. In turn, the voltage and clock speed of the CPU can be modulated for a specified time interval associated with the predicted application demand. It will be apparent to one skilled in the art that while a CPU is used as an example here, the embodiments described herein apply to any suitable processor.

Figure 2:
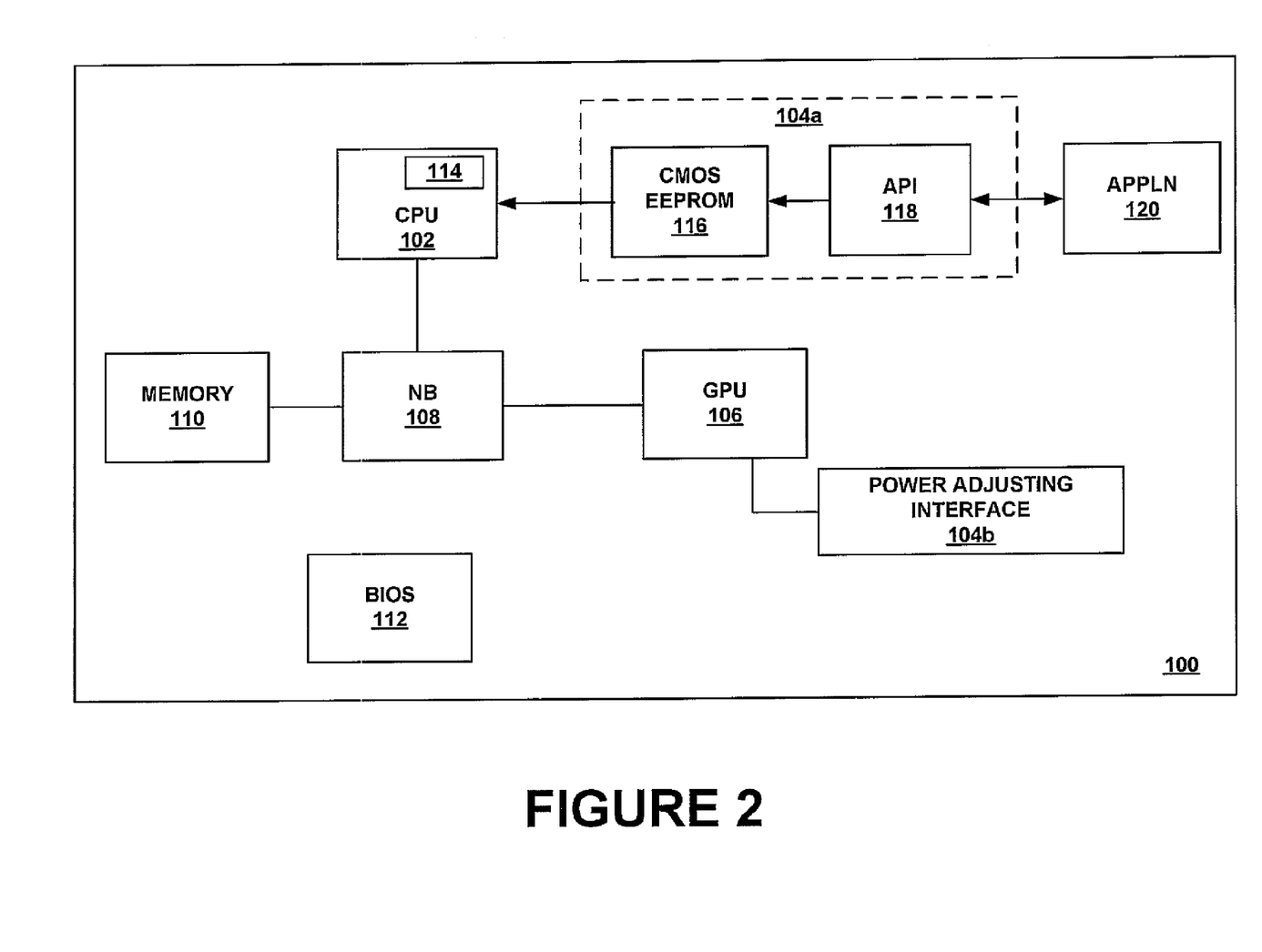
FIG. 2 is a simplified schematic diagram of the system of FIG. 1 providing a more detailed description of the power adjusting interface for a microprocessor in accordance with one embodiment of the invention.

FIG. 2 is a schematic diagram of the system of FIG. 1 providing a more detailed description of the power adjusting interface for a processor in accordance with one embodiment of the invention. Here, device 100 includes chipset 108 in communication with CPU 102, GPU 106 and memory 110. BIOS 112 is also included. Power adjusting interface 104a includes complementary metal oxide semiconductor (CMOS) electrically erasable programmable read only memory (EEPROM) 116 and a software application program interface (API) 118. Application program 120 is in communication with API 118 so that the future application demands can be communicated to API 118, which in turn provides the application demand to software in the EEPROM 116. Consequently, software in the EEPROM 116 can set the frequency for CPU 102 by writing data to control register 114 which controls the clock speed of the CPU. In one embodiment, power adjusting interfaces 104a and 104b control the voltage supplied to CPU 102 and GPU 106, respectively. In another embodiment, power adjusting interface 104b can include the same components as described with respect to power adjusting interface 104a. It should be appreciated that power adjusting interfaces 104a and 104b can be configured differently as discussed in more detail with respect to FIG. 3.

It will be apparent to one skilled in the art that device 100 of FIGS. 1 and 2 can be any suitable electronic device having a microprocessor. For example, device 100 may be a portable device such as a laptop computer, cellular phone, personal digital assistant, etc. While the adaptive power consumption properties disclosed herein enhance the battery life of the portable electronic devices, the invention is not limited to portable electronic devices. For example, device 100 can be associated with a desktop computer. While battery life is not an issue with a desktop system, the embodiments described herein will conserve energy. Additionally, power adjusting interface 104 can be associated with any suitable processor including a CPU, a GPU, a network processing unit (NPU), a storage processing unit (SPU), etc. Various processing units are described in U.S. patent application entitled "Method and Apparatus For Providing An Integrated Network of Processors", filed on May 13, 2002, with Ser. No. 10/144,658, incorporated herein by reference.

Figure 3:
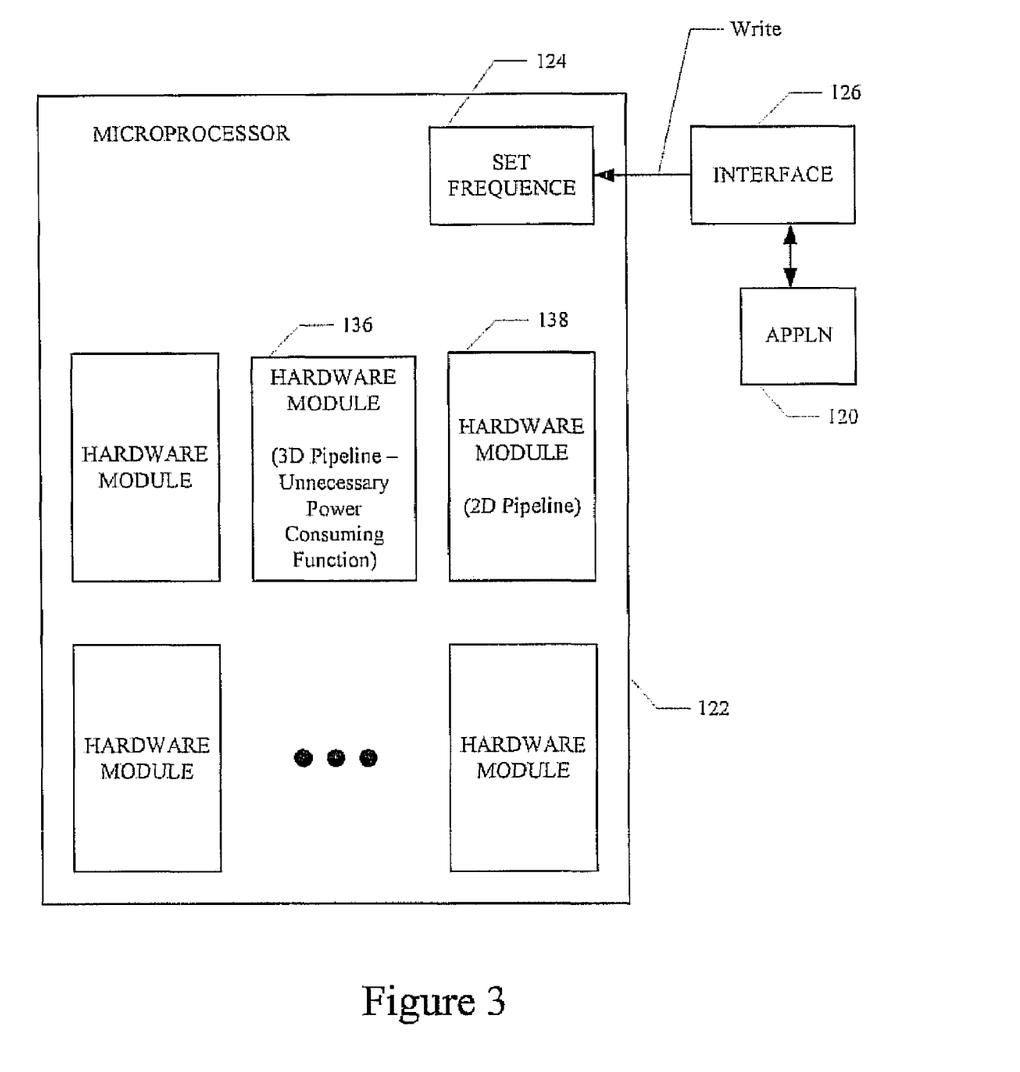
FIG. 3 is a simplified schematic diagram of an interface configured to adapt power consumption of a microprocessor in accordance with one embodiment of the invention.

FIG. 3 is a schematic diagram of an interface configured to adapt power consumption of a microprocessor in accordance with one embodiment of the invention. Microprocessor 122 includes control register 124 where the clock frequency is set. Interface 126 is in communication with microprocessor 122. More particularly, interface 126 is configured to write to control register 124 to adapt the power consumption of microprocessor 122. The communication link between interface 126 and application 120 provides the feedback necessary to adapt the power consumption of microprocessor 122 to the load level. In one embodiment, application 120 communicates with interface 126 in the form of a driver and/or an application program interface (API). In another embodiment, the instructions providing data to the control register are decoded by an instruction decoder contained within microprocessor 122. The instruction decoder is configured to identify special instruction that writes a value to control register 124. One skilled in the art will appreciate that the instruction can be a privileged instruction in one embodiment. It should be appreciated that the feedback of the forward looking application demand allows for the power, i.e., clock frequency, to behave as a "just in time" power supply or clock frequency for each level of application demand.

It will be apparent to one skilled in the art that interface 126 can be in the form of an API as discussed with reference to FIG. 2 or an operating system interface. For example, the operating system interface could put microprocessor 122 in a lower power state when the operating system (OS) is in an idle mode. The application specific throttling provided by interface 126 can place microprocessor 122 in a low power mode, however, the microprocessor is enabled to be returned to a high power mode fast enough without causing any delays. That is, for a higher application demand following the low power mode the microprocessor wakes up so that no delays are caused. Where interface 126 is an API, the clock speed, i.e., frequency, can be supplied through a frequency plot or a table specifying the frequency for specified time periods. In one embodiment, the API is at the ring 3 level which could call a ring 0 driver. One skilled in the art will appreciate that the table or graphs supplied help eliminate any overhead caused by switching between modes. In one embodiment, interface 126 is a set of instructions for adapting the power level or clock frequency of microprocessor 122.

Figure 4:
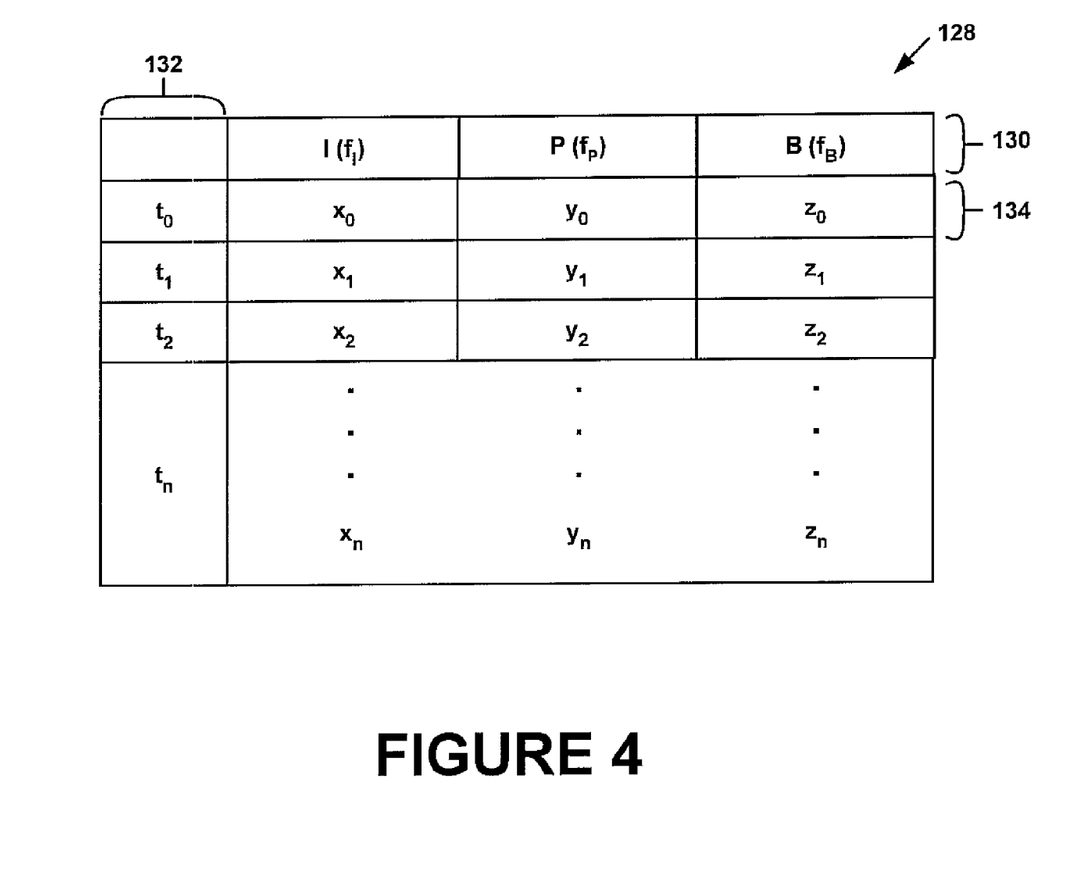
FIG. 4 is a table displaying the different frames of the motion picture expert group (MPEG) standard where time intervals between each of the frames are associated with a frequency that is accommodated by a microprocessor in accordance with one embodiment of the invention.

FIG. 4 is a table displaying the different frames of the motion picture expert group (MPEG) standard where time intervals between each of the frames are associated with a frequency that is accommodated by a microprocessor in accordance with one embodiment of the invention. Significant power savings can be realized for digital video disc (DVD) playback on a portable computer with this embodiment. As is generally known, the MPEG compression technique includes three types of frames, the intra (I) frame, the predicted (P) frame and the bidirectional (B) frame. Here, the inter frame load during decode can be monitored to adapt power consumption per frame. With the MPEG standard, the processing power demanded by each frame varies drastically between the three (I, P, and B) frame types. That is, the load for the bi-directional frames is significantly less than the load for the intra frames when using a GPU based MPEG decode accelerator. Generally, for the case of doing everything on the CPU, the loads are reversed. Accordingly, the microprocessor can be throttled back for the bi-directional frames and brought back up for the intra frames.

In one embodiment, the table of FIG. 4 can be supplied through the interface of FIGS. 2 and 3. Row 130 contains frequencies ($f_I$, $f_P$, and $f_B$) that the microprocessor will run at for the I, P and B frames, respectively. Column 132 represents the time periods for running the specified frequency for each frame. For example, time period $x_0$ through $x_n$ correspond to successive I frames 0-n. The same is true for the time periods associated with the P and B frames. Alternatively, rather than having a plurality of time periods for each successive frame, a single time period can be applied for the each frame type. For example, table 128 would consist of row 134 where one time period is associated with each frame type. The interface 126 can be used to set the table 128 values once for a particular video, or update the values periodically. Updating the table 128 values periodically can account for varying decode time periods. For example, the decode time periods can be set by using a predictive filter (i.e., a filter that generates an estimate of a future value based on past values), as known in the art of digital signal processing.

Still referring to FIG. 4, once a video frame is decoded, the microprocessor can go into a sleep mode where only enough power is supplied to keep time. For example, the time to decode a video frame associated with the MPEG standard is about 3 milliseconds when using a currently available GPU-based MPEG decode accelerator. A typical display rate of 24 frames per second, translates to each frame being displayed for 42 milliseconds. Therefore, the microprocessor can go into the sleep mode for 39 milliseconds in between frames as instructed through the interface. The power savings add up to a significant level over a period of time where a movie is watched on a portable computer. In one embodiment, the microprocessor transitions out of the sleep mode within one millisecond. Accordingly, a heuristic can be provided through the interface to throttle down the CPU and the GPU based upon a percent of idle time per frame. Furthermore, the GPU can turn off unused hardware modules during DVD playback operation. For example, where the portable computer is operating in a full-screen mode the 2-dimensional or 3-dimensional graphics pipelines 136, 138 are not needed. Thus, the interface can be configured to power down the unnecessary hardware modules 136, 138. It should be appreciated that the example of the interface with respect to the DVD playback application is for exemplary purposes and is not meant to be limiting as the interface can be configured to adapt the power of a microprocessor for any suitable application.

Figure 5:
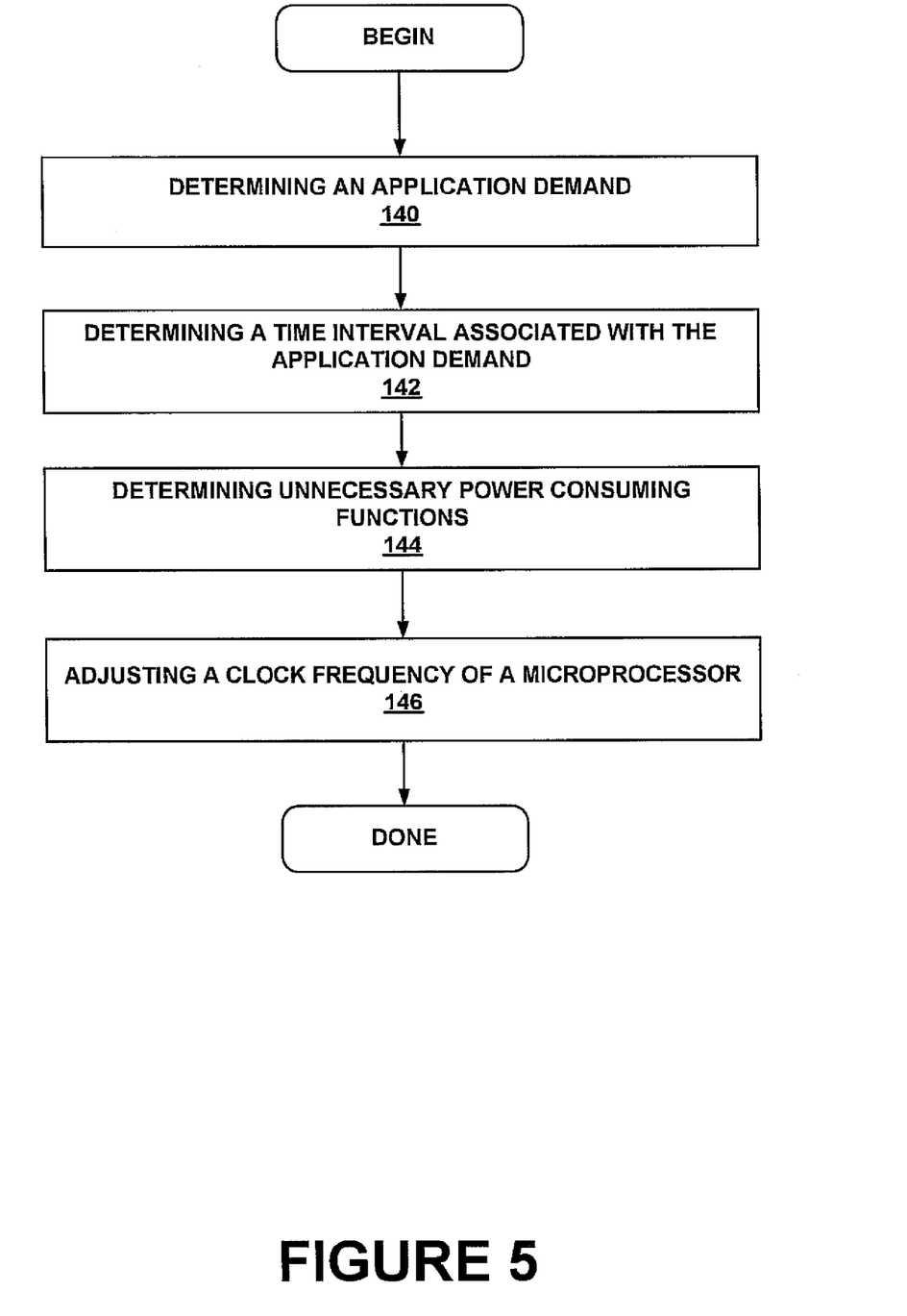
FIG. 5 is a flowchart diagram of the method operations for adapting power consumption of a microprocessor based upon an application demand in accordance with one embodiment of the invention.

FIG. 5 is a flowchart diagram of the method operations for adapting power consumption of a microprocessor based upon an application demand in accordance with one embodiment of the invention. The method initiates with operation 140 where an application demand is determined. Here, the application demand is based upon a current processing operation. For example, the processing operation can be DVD playback of a movie, a computer game, video editing, word processing, etc.

The method then advances to operation 142 where a time interval associated with the application demand is determined. The time interval is the period of time that a certain application demand will be required for, such as the time period in between frames of a DVD playback of a movie. The method then proceeds to operation 144 where unnecessary power consuming functions are determined. For example, the 3-dimensional pipeline 136 for a GPU can be turned off if the computer is only doing DVD playback that does not require any 3-dimensional processing. The method then moves to operation 146 where a clock frequency of a microprocessor is adjusted for the unnecessary power consuming functions. In another embodiment, the clock frequency of the microprocessor is adjusted for a portion of the determined time interval.

Figure 6:
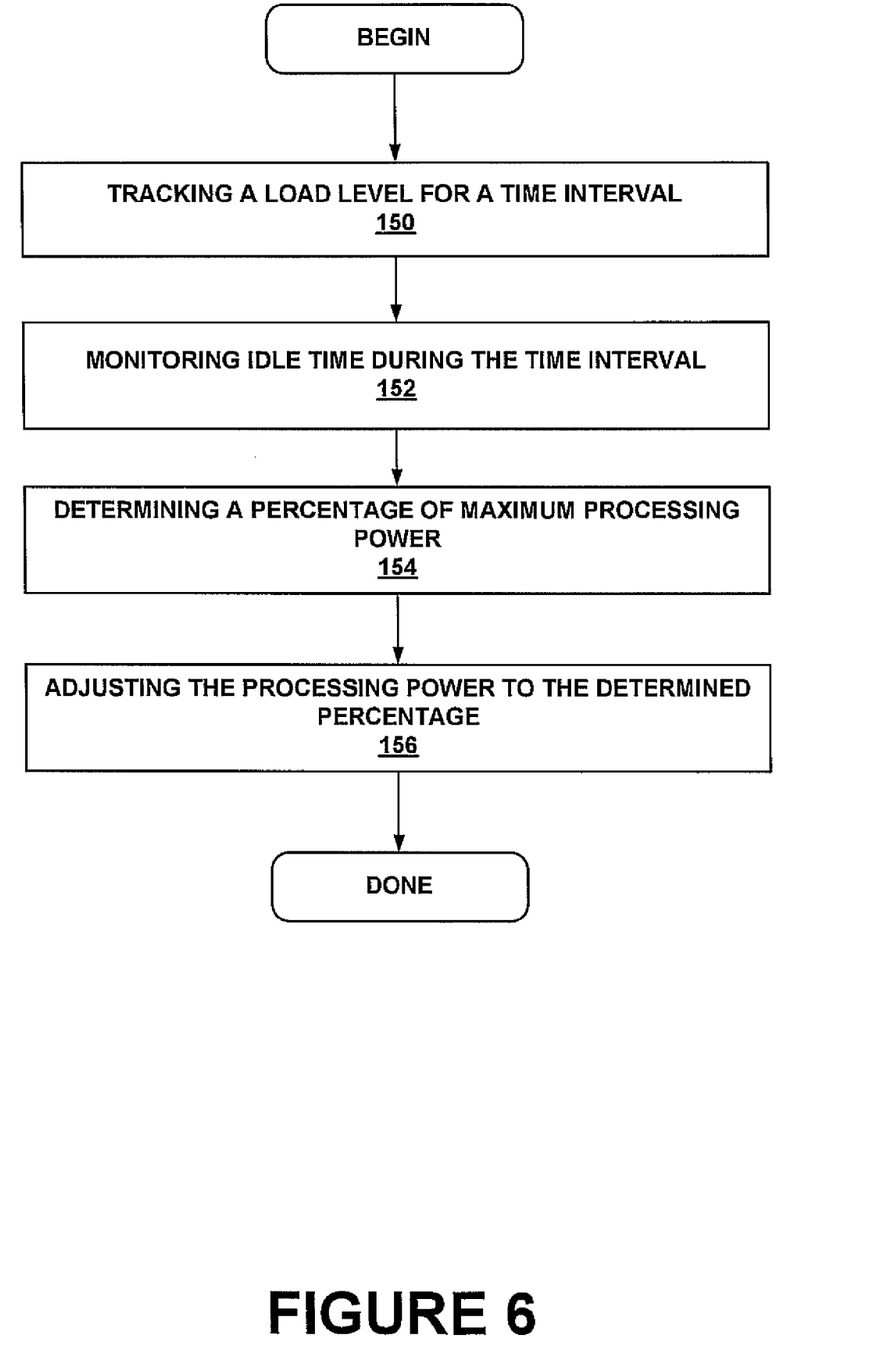
FIG. 6 is a flowchart of the method operations for adapting the processing power of a microprocessor for a load level in accordance with one embodiment of the invention.

FIG. 6 is a flowchart of the method operations for adapting the processing power of a microprocessor for a load level in accordance with one embodiment of the invention. The method initiates with operation 150 where a load level is tracked for a time interval. Here, the load level is associated with an application demand on a microprocessor. In one embodiment, a plurality of load levels can be monitored, such as the load levels for the different frames of the MPEG standard discussed with reference to FIG. 4. The method then advances to operation 152 where idle time during the time interval is monitored. Here, the microprocessor can complete an operation, such as decoding a frame within a certain time that is less than the time interval needed for the frame to be presented. Thus, the microprocessor will sit idle at full power for a period of time. The method then moves to operation 154 where a percentage of maximum processing power of the microprocessor that is sufficient for the load level is determined. For example, the microprocessor can sit in a sleep mode and only needs to be supplied with enough power to track time when it is idle. Alternatively, the microprocessor may require some percentage of power that is less than full (100%) power.

The method then proceeds to operation 156 where the processing power of the microprocessor is adjusted to the determined percentage. Here, an interface can be provided where instructions are sent to a control register to modify the clock speed or voltage of the microprocessor as discussed with reference to FIGS. 1-4. The interface can be an API or an OS interface and the microprocessor can be a CPU, GPU, NPU, or a SPU. In one embodiment, an API can vary the clock frequency or voltage as a function of time, with reference to a synchronous event, such as the decoding of video frames as described above.

In summary, the embodiments described above allow for adapting the power consumption of a microprocessor based upon need. The need is determined by an application demand which is communicated to the microprocessor through an interface configured to write into a frequency control register of the microprocessor. In one embodiment, the control register is a floating point control register included with some commercially available microprocessors. With respect to DVD playback, the embodiments described herein can enable adapting the microprocessor to go into a sleep mode between the presentation of video frames allowing for a significant power savings. In turn, the battery life between charging is extended. Consequently, the viewing of movies can be easily accomplished on a portable computer without the necessity of having to switch multiple battery packs to complete the viewing of the movie.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

The invention claimed is:

1. A method comprising:
   determining a future demand of an application through a hook to the application;
   determining a time interval associated with the future demand from a table that associates the future demand of the application to a corresponding time interval;
   determining unnecessary power consuming functions within a processor based on the future demand; and
   writing data to a control register based on the future demand, time interval and unnecessary power consuming functions, wherein the control register controls power consumption within the processor.

2. The method of claim 1, wherein the processor is selected from the group consisting of a central processing unit (CPU), a graphics processing unit (GPU), network processing unit (NPU) and a storage processing unit (SPU).

3. The method of claim 1, wherein the unnecessary power consuming functions include one of a 3-dimensional graphics pipeline and a 2-dimensional graphics pipeline, each pipeline associated with a graphics processing unit.

4. The method of claim 1, wherein the current processing operation is associated with playback of a movie on a portable computer.

5. A method comprising: determining a future demand of an application through a hook to the application;
   determining a time interval associated with the future demand from a table that associates the future demand of the application to a corresponding time interval;
   determining unnecessary power consuming functions within a processor for the time interval and the future demand; and
   writing data to a control register based on the further demand, the time interval and the unnecessary power consuming function, wherein the control register controls a clock speed of the processor and a plurality of power consuming functions of the processor.

6. The method of claim 5, wherein the processor is selected from the group consisting of a central processing unit (CPU), a graphics processing unit (GPU), network processing unit (NPU) and a storage processing unit (SPU).

7. The method of claim 5, wherein the unnecessary power consuming functions include one of a 3-dimensional graphics pipeline and a 2-dimensional graphics pipeline, each pipeline associated with a graphics processing unit.

8. The method of claim 5, wherein the current processing operation is associated with playback of a movie on a portable computer.

* * * * *